June 23, 1964

R. D. LAMBERT 3,138,108

GEAR PUMP

Filed June 13, 1961

INVENTOR

Robert D. Lambert

BY Connolly and Hutz

ATTORNEYS

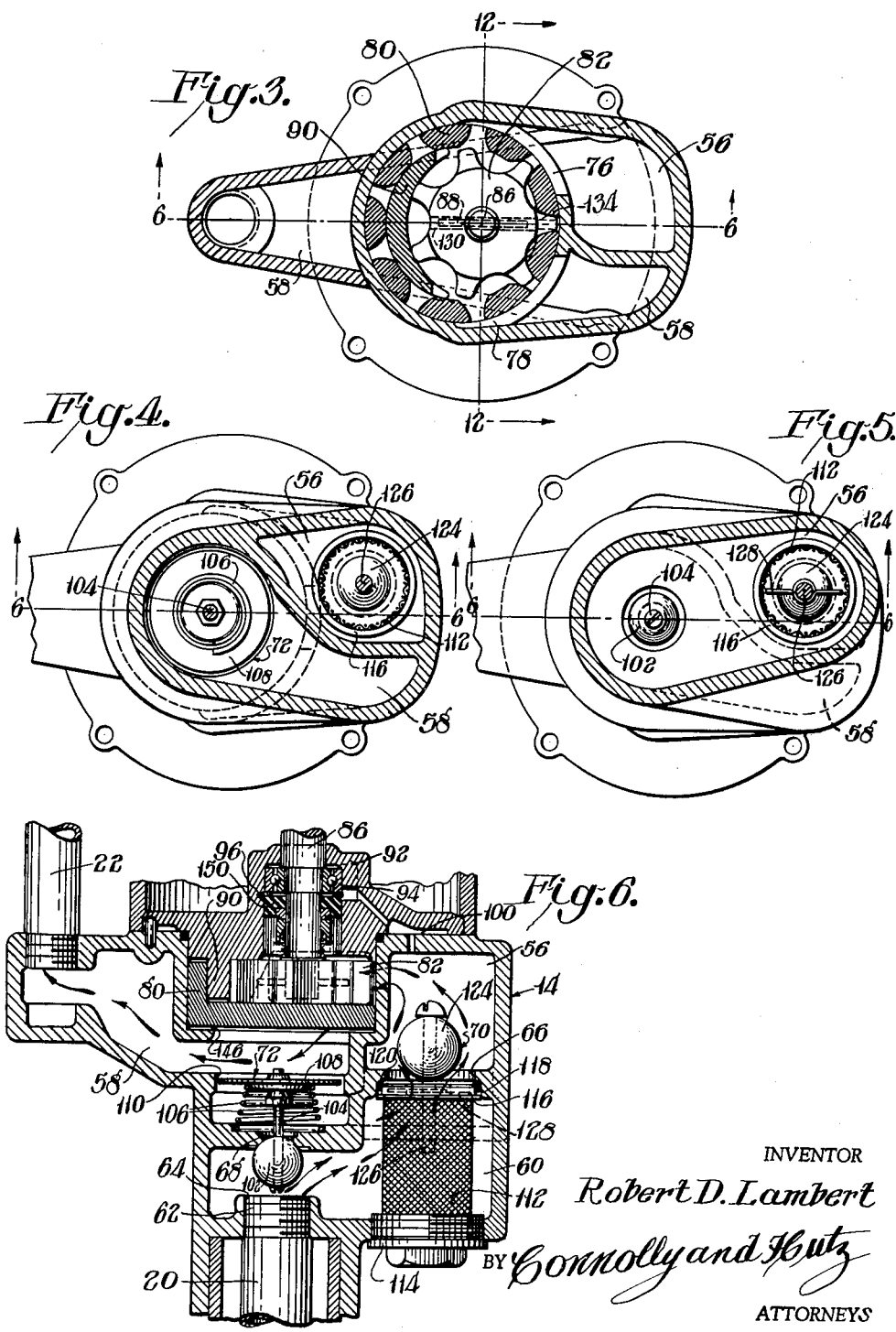

June 23, 1964 R. D. LAMBERT 3,138,108
GEAR PUMP
Filed June 13, 1961 4 Sheets-Sheet 4

INVENTOR
Robert D. Lambert
BY Connolly and Hutz
ATTORNEYS

United States Patent Office

3,138,108
Patented June 23, 1964

3,138,108
GEAR PUMP
Robert D. Lambert, Fort Wayne, Ind., assignor to Symington Wayne Corporation, Salisbury, Md., a corporation of Maryland
Filed June 13, 1961, Ser. No. 116,718
6 Claims. (Cl. 103—126)

This invention relates to a positive displacement pump of the gear type, and it more particularly relates to such a pump of the internal gear type.

It has been customary to transmit the drive from a motor to the external gear element of a gear type pump. This external gear is, therefore, usually referred to as a rotor; and it is engaged by an internal gear, referred to as an idler gear. This arrangement requires separate bearings for both of the gears and special means for maintaining proper axial alignment between them. Furthermore, the motor driven gear is rigidly secured to its driving shaft which complicates maintenance of accurate alignment and causes noise and vibrations.

An object of this invention is to provide a simple and economical structure for a gear pump which minimizes: the number of bearings, alignment problems, operating friction and noise.

In accordance with this invention the drive shaft from the motor to a gear pump is connected to the internal gear instead of to the external gear as has heretofore been conventional. The external gear can therefore float in a cylindrical cavity in the pump casing within which it is inserted without any bearings other than the inherent journal bearings that its rotation within the cylindrical cavity provides. This makes it possible to utilize only one shaft bearing in the head of the pump casing which may also serve as one of the motor bearings.

The axial alignment of the internal elements may be simply maintained by exposing the entire back of the external gear to discharge pressure which urges it toward the internal gear whose hub is thickened to preserve the required clearance between the parts. The shaft is loosely resiliently connected to the internal gear to permit it to automatically seek optimum axial alignment and to allow the interengaged gears to maintain driving contact at all times which contribute to the smooth and quiet operation of the pump. Furthermore, the use of only a single shaft bearing within the pump minimizes tolerance accumulation between moving parts by allowing it to be fully controlled within the head of the pump which includes the shaft bearing. This head also includes a novel mechanical seal in which an inward inclined surface of the wearing ring squeezes an O-ring against the shaft to insure a perfect seal without transmitting undue force to the mating portions of the seal.

Novel features and advantages of the present invention will become apparent to one skilled in the art from a reading of the following description in conjunction with the accompanying drawings wherein similar reference characters refer to similar parts and in which:

FIG. 2 is a cross-sectional view taken through the vertical axis of the embodiment shown in FIG. 1;

FIGS. 3-5 are cross-sectional views taken through FIG. 1 along respectively numbered lines;

FIG. 6 is a cross-sectional view similar to the corresponding portion of FIG. 2 in the flow condition;

Figure 1:
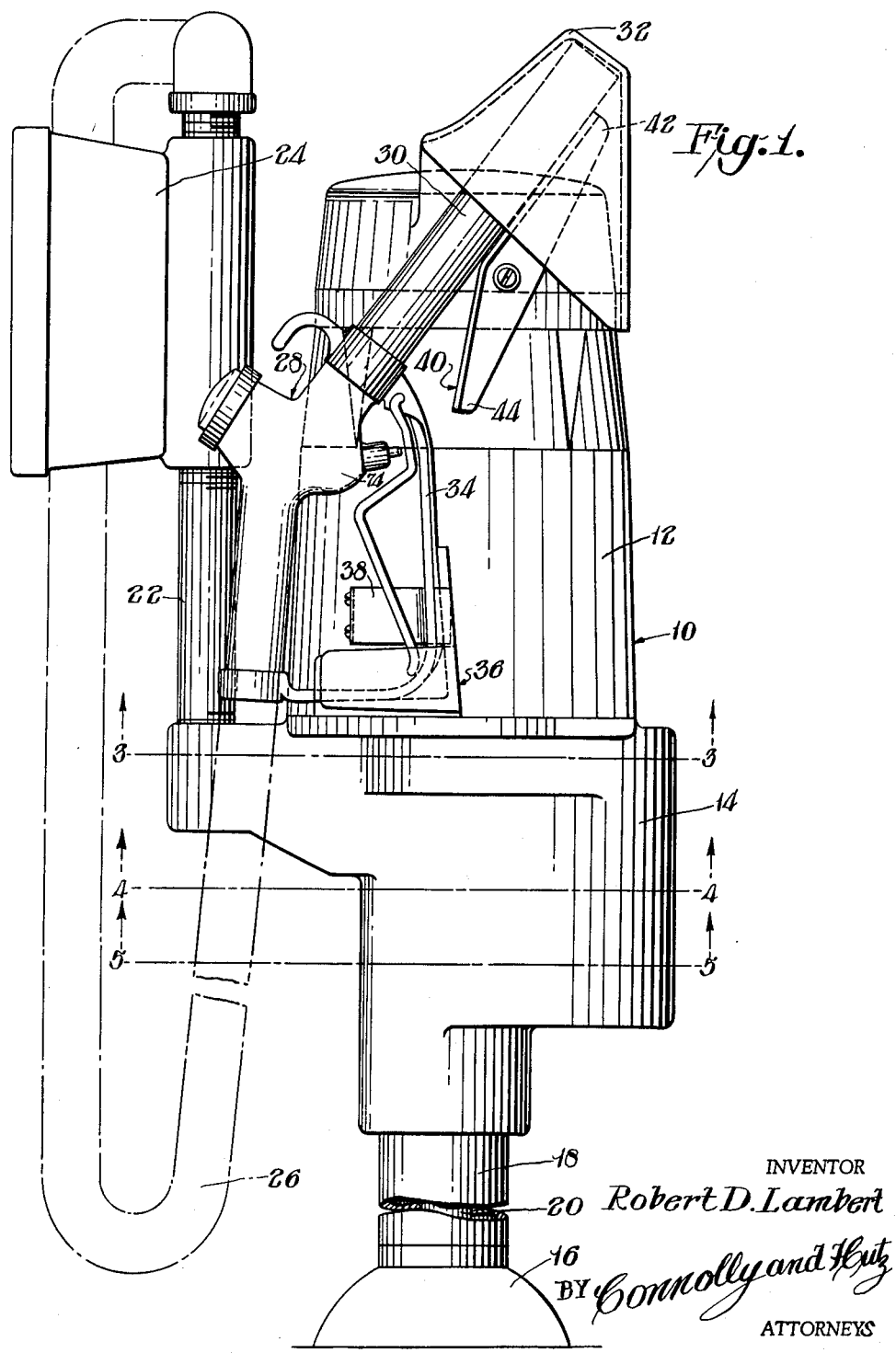
FIG. 1 is a front view in elevation of a motor-pump assembly incorporating an embodiment of this invention.
Figure 7:
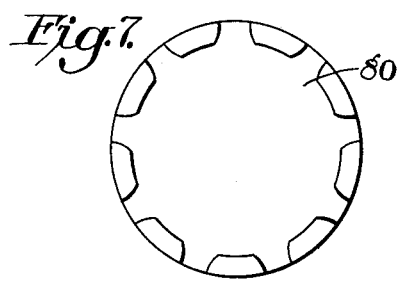
FIGS. 7 and 8 are respectively plan and elevational views of the external gear of the embodiment shown in FIG. 6.
Figure 9:
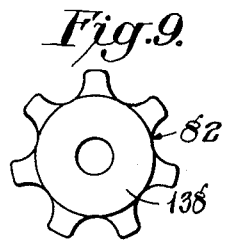
FIGS. 9 and 10 are respectively plan and elevational views of the internal gear of the embodiment shown in FIG. 6.
Figure 8:
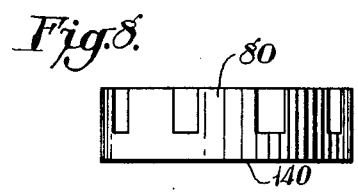
Figure 10:

In FIG. 1 is shown a motor-pump assembly 10 including an electric motor 12 directly coupled to a pump 14 which is mounted upon its supply tank 16 by a stand pipe 18 through which suction tube 20 extends. Pump 14 discharges through pipe 22, meter 24, hose 26 and nozzle 28 which is controlled by valve 74. Nozzle 28 is shown in FIG. 1 in the stored position in which spout 30 is inserted within boot 32 and handle 34 is inserted within open-ended pocket 36 within which it is detachably secured by retaining spring 38. In this stored position spout 30 maintains switch-operating lever 40 in the "off" position in which inner end 42 of lever 40 contacts the wall of boot 32. When spout 30 is removed from boot 32, outer end 44 of lever 40 can be manually actuated to turn motor switch 46, shown in FIG. 2, "on" by rotation of shaft 48 secured to lever 40 and attached spring fingers 52 which urge operating arm 50 of switch 46 into the "on" position. Details of this novel switch operating and interlocking arrangement are described in detail in commonly assigned copending application S.N. 116,719, filed June 13, 1961.

In FIG. 2 is shown casing 54 of pump 14, which is of the internal gear type. Casing 54 includes suction chamber 56, discharge chamber 58 and bypass chamber 60 which are utilized in a novel release and check valve arrangement described in detail in commonly assigned copending application, S.N. 116,720, filed June 13, 1961, by this same inventor.

The top 62 of supply tube 20 is connected within inlet 64 to bypass chamber 60, and bypass chamber 60 communicates with suction chamber 56 and discharge chamber 58 through check port 66 and relief port 68. Check valve 70 is mounted within check port 66 to prevent back flow, and relief valve 72 is mounted within relief port 68 to allow pressure to be relieved from discharge chamber 58 when it rises above a predetermined maximum setting.

As shown in FIG. 3, suction chamber 56 communicates with the low pressure portion of the pump through suction port 76, and discharge chamber 58 communicates with the high pressure part of the pump through discharge port 78. External gear 80 and interengaged gear 82 are inserted within cylindrical cavity 84 with internal gear 82 being loosely resiliently secured to shaft 86 by spring pin 88 in a manner later described in detail. Crescent 90 extends from casing cover 92 between external gear 80 and internal gear 82 in the conventional manner.

Figure 11:
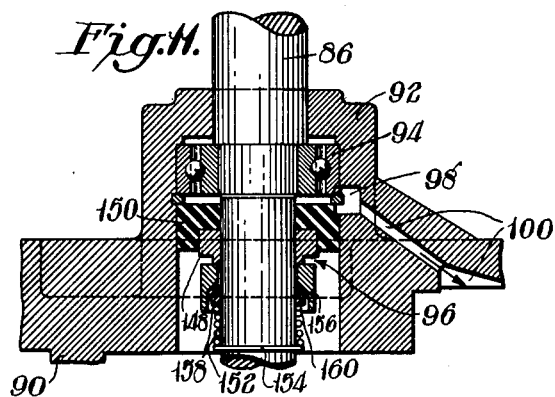
FIG. 11 is an enlarged cross-sectional view of the bearing and seal portions of the embodiment shown in FIG. 6.

As shown in FIG. 11, the portion of shaft 86 extending within the pump is rotatably and axially supported in ball bearing 94, and the portion of the shaft passing into pump cavity 84 is sealed by a novel mechanical seal 96 later described in detail. An annular groove 98 adjacent bearing 94 collects any leakage through the seal which is drawn through passageway 100 into suction chamber 56.

Relief valve 72 includes a rubber ball 102 mounted upon stem 104 and a compression spring 106 which reacts between casing 34 and disc 108 in a direction to seat ball 102. Disc 108, also as described in copending application S.N. 116,720, acts as a flow responsive element which increases the pressure necessary to unseat ball 102 under flow conditions over that at non-flow to permit relief valve 72 to relieve at a lower pressure such as 5 p.s.i. when discharge valve 74 is closed yet be maintained closed at pressures up to 13 p.s.i. when discharge valve 74 is opened. The generous clearance space between disc 108 and passageway 110 within which it is mounted permits pressure around it to equalize thereby causing only the differential pressure exerted upon ball 102 to force it off its seat. The parallel arrangement of relief valve 72 and check valve 70 also permits operation of relief valve 72 when the pump is completely shut down.

Check valve 70 includes a cylindrical strainer 112 inserted within hollow plug 114 and having an annular cap 116 inserted and sealed within a recess 118 in the wall of casing 54 separating suction chamber 56 from bypass chamber 60 by O-ring 120. Cap 116 includes a central aperture 122 which provides a seat for rubber ball check 124 secured upon one end of stem 126 whose inner end is loosely secured within cap 116 and strainer 112 by spring clip 128 inserted in a groove (not shown) in stem 126.

As shown in FIG. 3, internal gear 82 is loosely resiliently secured to shaft 86 by spring pin 88 which is loosely inserted into a diametric hole 130 through gear 82. The smaller diametric extension 134 of hole 130 provides a means of driving pin 88 out of shaft 86. Hole 130 is, accordingly, much wider than pin 88 to permit axial movement of internal gear 82 relative to pin 88, which allows it to seek its optimum axial operating positions regardless of any inaccuracies caused by tolerance accumulation in the various assembled parts. Pin 88 is, for example, a piece of steel spring wire 0.110 inch in diameter; and the hole in gear 82 is, for example, 3/16 inch in diameter. This floating resilient arrangement also allows the teeth of internal gear 82 to maintain driving contact with the teeth of external gear 80 regardless of any inaccuracies in tooth indexing and machining. Pin 88 is secured within shaft 84 by set screw 132, shown in FIG. 2; and its loose fit in hole 130 causes the drive to gear 82 to be carried through the tips of spring pin 88. Spring pin 88 is resilient enough to appreciably deflect during operation in an amount, for example, of approximately 0.004 inch which allows it to alternatively store and release energy when the internal gear velocity varies from time to time because of irregularities in the engaged gear teeth. This resiliency maintains driving contact between the gear teeth at all times thereby eliminating bouncing, which might ordinarily result from an accumulated normal backlash of from 0.003 to 0.006 inch and thereby greatly contributing to the remarkable smoothness and quietness of this pump.

Figure 12:
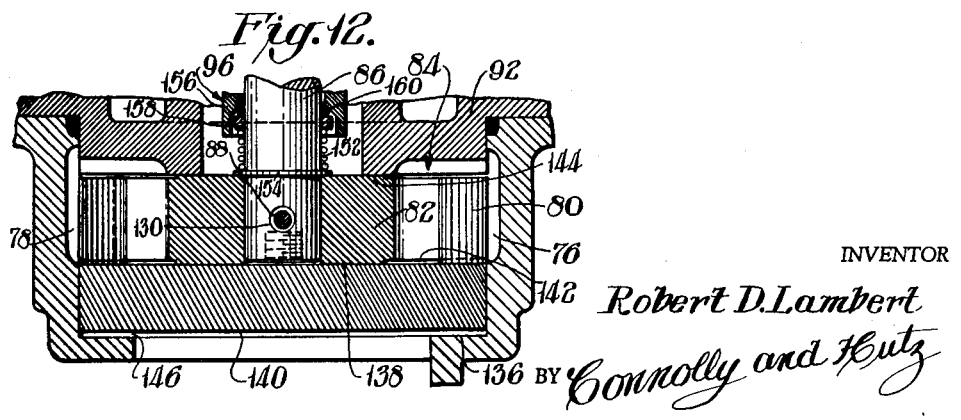
FIG. 12 is an enlarged cross-sectional view of the engaged internal and external gears of the embodiment shown in FIG. 6 taken through the vertical axis of the pump at an angle different to that of FIG. 6.

The aforementioned resilient drive through internal gear 82 is facilitated by the floating arrangement of external gear 80 within cavity 84 as shown in FIG. 12. The backward axial movement of external gear 80 is restricted by step 136 in casing 34 and in the forward direction by enlarged hub 138 of internal gear 82. Hub 138 is actually the primary and sole axial alignment control because the discharge pressure acting upon the rear face 140 of external gear 80 overcomes the combined suction and discharge pressure acting upon the inner face 142 of gear 80 to maintain gear 80 urged into contact with internal gear hub 138. Hub 138 is thicker than its teeth and also the teeth of external gear 80 and crescent 90, which are all approximately equal in length, to allow all of the thrust to be transmitted between external gear 80, idler hub 138 and thrust surface 144 within casing head 92. When idler hub 138 ranges from 0.0015 to 0.0025 inch longer than the gear teeth and crescent the aforementioned relationship is easily maintained. A slight clearance space 146 is accordingly illustrated in FIG. 12 between rear face 140 of gear 80 and step 136 to illustrate the condition in enlarged form which occurs during operation as well as the operating clearances between the ends of the gear teeth and crescent.

As shown in FIG. 11, seal 96 includes a sealing ring 148 of a material such as carbon which wears to a smooth surface. Seal ring 148 is secured within casing cover 92 and about shaft 86 by a retainer 150, which is for example made of rubber. A compression spring 152 reacts against lock ring 154 secured within a groove in shaft 86 to urge wearing ring 156 made of metal into smooth sealing contact with carbon ring 148. The force of spring 152 is transmitted to wearing ring 156 through a circular equalizing ring 158 and O-ring 160. Wearing ring 156 includes an inclined inner surface 162 which bears against O-ring 160 in a direction to compress ring 160 against the surface of shaft 86 thereby providing a dependable seal between wearing ring 156 and shaft 86 without imposing undue pressures upon the contacting surfaces of wearing ring 156 and carbon ring 148. This remarkably minimizes the frictional wear imposed upon carbon ring 148 in comparison to that exerted in existing types of mechanical seals in which surface 162 is perpendicular to the axis of shaft 86.

What is claimed is:

1. An internal gear pump comprising a casing having a cavity, a pumping chamber in said cavity having a wall, an external gear pumping element freely rotatably mounted within said pumping chamber, an internal gear pumping element inserted in meshing engagement within said external gear pumping element within said pumping chamber, a motor-driven shaft connected to said internal gear pumping element directly and therethrough to said external gear pumping element for pumping fluid through said pump, said external gear pumping element including a blank rear face and a toothed working face having radially disposed teeth and spaces in between them, said internal gear pumping element including an extending hub disposed toward and in contact with the adjacent inner surface of said external gear pumping element, said casing including suction and discharge ports extending through said wall of said pumping chamber and communicating with said toothed working face of said external gear pumping element, said casing incorporating a discharge chamber communicating with said discharge port and contiguous with the rear of said wall of said pumping chamber, said casing including a suction chamber communicating with said suction port, and a substantial portion of the rear wall of said pumping chamber between said rear face of said external gear pumping element and said discharge chamber being cut away and to cause discharge pressure to be communicated to said rear face to expose a greater area of said rear face to discharge pressure than to which said toothed working face of said external gear pumping element is exposed whereby said external geared element is forced into thrust bearing contact with said hub of said internal gear pumping element.

2. A pump as set forth in claim 1 wherein said internal gear pumping element is resiliently connected to said shaft to facilitate the maintenance of contact between the teeth of said gear pumping elements.

3. A pump as set forth in claim 2 wherein said resilient connection comprises a spring pin which is secured to said shaft and loosely fitted within a diametric hole in said internal gear pumping element.

4. A pump as set forth in claim 3 wherein a set screw secures said pin within said shaft, and said diametric hole within said internal gear pumping element is wider than said pin to cause the drive from said shaft to said internal gear pumping element to be transmitted through the tips of said pin.

5. A pump as set forth in claim 1 wherein a crescent extends from a portion of said casing between said internal and external gear pumping elements, and the length of said crescent and said external and internal gear teeth being slightly less than the thickness of said hub of said internal geared pumping element to provide clearance about said teeth and said crescent and to permit said external geared element to be supported against longitudinal thrust upon the hub of said internal gear pumping element thereby minimizing frictional resistance between the working parts of said pump.

6. A pump as set forth in claim 1 wherein said suction and discharge chambers are constructed and arranged in line with the peripheral surfaces of said external gear pumping element to cause said suction and discharge ports to communicate through said spaces between its radial teeth.

References Cited in the file of this patent

UNITED STATES PATENTS

| | | |
|---|---|---|
| 1,497,050 | Wardwell | June 10, 1924 |
| 1,663,253 | Hillborn | Mar. 20, 1928 |
| 1,854,260 | Hofmann | Apr. 19, 1932 |
| 2,044,893 | Wilhelm et al. | June 23, 1936 |
| 2,247,454 | Thomson | July 1, 1941 |
| 2,281,157 | Kanuch et al. | Apr. 28, 1942 |
| 2,671,410 | Wahlmark | Mar. 9, 1954 |
| 2,787,963 | Dolan et al. | Apr. 9, 1957 |
| 2,830,542 | Erickson et al. | Apr. 15, 1958 |
| 3,038,413 | Emeny et al. | June 12, 1962 |